United States Patent Office 3,276,990
Patented Oct. 4, 1966

3,276,990
PROCESS FOR THE PRODUCTION OF CATION PERMSELECTIVE MEMBRANES
Hiroshi Hani, 7391 Kugenuma, Fujisawa, Japan; and Akira Nishihara and Hisao Hiraga, both of 62 Kuritaya Kanagawa-ku, Yokohama, Japan
No Drawing. Filed July 24, 1961, Ser. No. 125,958
11 Claims. (Cl. 204—296)

This invention relates to a process for the production of cation permselective membranes which have a length of more than 1 cm. in at least two dimensions, which have an insoluble infusible synthetic organic solid polymeric structure, a reinforcing material supporting the said solid polymeric structure and a dissociable sulfonic group bonded chemically to the said solid polymeric structure, and which are electrolytically conductive, selectively permeable to cation, and physically strong. Furthermore, this invention provides a process for the production of such cation permselective membranes which do not fracture or crack in the course of production or in use. Moreover, this invention provides a very desirable process for producing the said cation permselective membranes by mass production.

In U.S. Patent 2,636,851 to Juda et al. there is described synthetic polymeric material in the form of hydrous gels which may be formed into a large dimensioned structure such as a membrane. This material is electrically conductive and selectively permeable. Juda et al. report in the specification that the polymerizable ingredients were brought to a final stage of polymerization, during which they had to be kept in an aqueous solution under conditions preventing evaporation of water.

In U.S. Patent 2,730,768 to Clarke is also described a process for the production of electrically conductive membranes in which polymerization is carried out in the presence of organic solvents and in the absence of water.

In these patents, copolymerizable ingredients are reacted to a final stage of polymerization in the presence of water or solvents and under conditions preventing escape of the solvent, whereby cross-linked copolymers are obtained. This is due to the fact that if water or organic solvent escapes, the said cross-linked solid structure would be fractured. In fact, when the mixture of monomers of styrene, divinylbenzene and solvent are cast-polymerized between glass plates, as described in the Clarke patent specification, and the copolymerized product is sulfonated in the presence of a solvent, the fracture of the copolymer would not occur.

The present invention has succeeded, by an entirely different process, in obtaining cation permselective membranes which do not fracture in the course of production. Furthermore, another important feature of the present invention lies in the fact that the process according to the present invention is very suitable for industrial mass production in a continuous process, whereas the conventional processes are unadaptable to mass production because the copolymerizable ingredients are cast separately between glass-plates and polymerized in an autoclave. Since these conventional processes have to resort to the polymerization method as described above, it is difficult in practice to obtain a product which has large area and uniformly small thickness. On the contrary, in the present invention, it is easy to obtain a product which has large area and uniformly small thickness. Another feature of the present invention resides in that it is possible to obtain cation permselective membranes which are excellent in not only mechanical strength but also transport number and electrical conductivity.

Other important features and objects of the present invention will be apparent from the following description.

The present invention relates to a process for the production of cation permselective membranes which have a length of more than 1 cm. in at least two directions, which have an insoluble infusible synthetic organic solid polymeric structure, a reinforcing material supporting the said solid polymeric structure and a dissociable sulfonic group combined chemically with the said solid polymeric structure, and which are electrolytically conductive, selectively permeable to cations, comprising impregnating the reinforcing material with a latex of a linear copolymer which consists of monovinyl aromatic hydrocarbon compounds and conjugated aliphatic polyene compounds and contains 20 to 75% of bound monovinyl aromatic hydrocarbon compounds, drying and thus forming a membrane of the said linear copolymer supported by reinforcing material, and thereafter treating the said membrane with concentrated sulfuric acid in order to sulfonate and simultaneously to convert the said linear copolymer to an insoluble infusible three dimensional network structure.

In the present invention, as reinforcing materials, into which the latex of the said linear copolymer is impregnated, are used cloths made of organic or inorganic fiber which is resistant to various agents used in the following procedures of this invention and is water-proof. For this purpose, for example, glass fiber, polyvinyl chloride fiber, polyvinylidene chloride fiber, polyethylene fiber and polypropylene fiber are suitable. These reinforcing materials are used in order to maintain the correct dimensions of the cation permselective membranes during production and to obtain products with excellent electrochemical and mechanical properties. According to the present invention, it is difficult to obtain good results unless the volume ratio of the free space to the total cloth is 45 to 75%. If the volume ratio is out of the said range, the copolymer often exfoliates from the cloth during production. Also, the thickness of the cloth is preferably about 0.02 to 1.00 mm.

Monovinyl aromatic hydrocarbon compounds used in the present invention include styrene, α-methylstyrene, o-, m-, or p-methylstyrene, vinylnaphthalene and the like, the typical substance of them being styrene. Conjugated aliphatic polyene compounds include butadiene-1,3, isoprene, 2,3-dimethylbutadiene-1,3 and the like, and among them the butadiene-1,3 is used most commonly. Since latices of linear copolymers obtained from styrene and butadiene are now being produced in commercial quantities for synthetic rubber and resins, it is most convenient to use these latices as raw materials. Furthermore, the quality of the product is excellent when this raw material is used.

When the latex of linear copolymer is impregnated into the said reinforcing material and dried, it fills completely the voids of the reinforcing material and a continuous structure is formed in and on the surface of the reinforcing material, and thus, a membrane is formed. At this time, no crack should be permitted to occur on drying, namely, the said linear copolymer must have a good film forming property.

In the present invention, the fact that latices of linear copolymers obtained from monovinyl aromatic hydrocarbon compounds and conjugated aliphatic polyene compounds are used, and further the fact that the ratio of both ingredients of latex is, as mentioned previously, 20 to 75% of the former and accordingly, 80 to 25% of the latter, are very important in this context. When the content of the bound monovinyl aromatic hydrocarbon compound in the latex is less than 70%, the film forming property is adequate. If its content is in excess of 70%, film formation becomes difficult, but even in this case the addition, as a plasticizer, of a latex of an acrylnitrile-butadiene copolymer or the same latex of the linear copolymer in which the content of monovinyl aromatic hydrocarbon compound is lower, up to less than 75% effectively makes usable the said latex. The content of monovinyl aromatic hydrocarbon compound, as mentioned just above, has a very great significance not only for film formation but also for subsequent treatment, that is, when the content of monovinyl aromatic hydrocarbon compound is more than 75%, there is obtained only a product in which the copolymer greatly swells upon the subsequent treatment with concentrated sulfuric acid, and this results in peeling off of the resin from the support. On the other hand, the content of conjugated aliphatic polyene compound in the copolymer latex also has an important significance, in that when the content exceeds the predetermined limit the copolymer not only becomes harder and more brittle by the treatment with concentrated sulfuric acid, but also becomes more easily exfoliable from the reinforcing material. Furthermore, in such a case the content of conjugated aliphatic polyene compound beyond this limit departs from the purpose of this invention because fewer sulfonic groups can be introduced. Thus, for the production of cation permselective membranes, a latex of linear copolymers obtained from monovinyl aromatic hydrocarbon compounds and conjugated aliphatic polyene compounds, in which the content of the former is 20 to 75%, is indispensable.

Linear copolymers of styrene-butadiene are already known as a raw material for synthetic rubber and have great elongation and mechanical strength owing to their structure. Other linear copolymers used in the present invention are substantially the same in this respect. Furthermore, it has been found in connection with this invention that the membranes thus formed from the latices of these linear copolymers, particularly the membranes in which the ratio of both ingredients is within the said range, have remarkable and unexpected properties. The membranes formed of these latices do not fracture upon treatment with concentrated sulfuric acid. Furthermore, it is possible not only easily to introduce sulfonic groups in the aromatic nucleus in the molecules but also simultaneously to convert such a linear copolymer to an insoluble infusible three dimensional network structure, and the structure thus obtained does not fracture upon the subsequent treatment. This reaction may be hereinafter called cyclization because it is very close to cyclization as in natural rubber.

In U.S. Patent 2,645,621 to D'Alelio, it is disclosed that butadiene may be used as a raw material instead of divinyl benzene because divinyl benzene of consistent quality can not industrially be produced, and a mixture of styrene and butadiene is copolymerized in an autoclave in the presence of catalyst, and thus, a bead-like cross-linked copolymer with 75 to 98% of styrene content is thereafter converted to a bead-like ion exchange resin by sulfonation. According to this method, however, it is impossible to produce membraneous material in which cloth is used as the reinforcing material, and further, the membrane making process can not be carried out as in the present invention because the cross-linking by butadiene has already occurred during copolymerization.

In contrast, according to the present invention in which styrene-butadiene linear copolymer latices are used and further their ingredients are within the said range, it is possible to produce very easily cation permselective membranes having a length of more than 1 cm. in at least two dimensions.

The latex used in the present invention can be produced by emulsifying, in aqueous medium and polymerizing the monomer to be copolymerized at a comparatively low temperature in the presence of an emulsifier, a stabilizer, a catalyst, a pH-adjusting agent, a surface-tension-adjusting agent and other well-known addition agents. For the reason as described above, the use of a latex of a linear copolymer obtained from styrene and butadiene, which is now commercially available, is most convenient, and consequently, in this invention such products as are easily available on the market are preferably used. These commercial latices of styrene-butadiene copolymers are ones which are scarcely cross-linked, and in this sense they may be called linear copolymers and are soluble in solvents for rubber such as benzene. Therefore, the linear copolymers of the present invention include polymers of monovinyl aromatic hydrocarbon compounds and conjugated aliphatic polyene compounds, which are not substantially cross-linked.

The present inventors previously prepared membranes by calendering the bulk copolymers consisting of the same monovinyl aromatic hydrocarbon compounds and conjugated aliphatic polyene compounds with rolls or by dissolving such a copolymer in a solvent and impregnating a reinforcing material with the resulting solution. The inventors then investigated a method in which the membrane thus obtained was treated subsequently in the same manner as described in the present invention, but it was found that in this method, membrane formation was more difficult than in the present invention, a longer time was required for the reaction and the mechanical strength and electrochemical properties of the product were inferior to those of the product of the present invention.

According to the present invention, it is not necessary to follow any special procedure to impregnate the latex into the reinforcing material, that is, the reinforcing material may be dipped in the latex and then taken out, or the latex may be coated on the reinforcing material. Particularly in the case of mass production, a long roll of reinforcing material may be dipped in the latex successively from its one end and taken out to be dried, and thus, a continuous membrane formation can be carried out.

The latex used in the present invention can easily be obtained even when its solids content is high, such as about 60%. The viscosity of this latex with high solids content is much smaller than that of a solution of a comparatively lower concentration of copolymer. Accordingly, when the reinforcing material is dipped in latex and dried, and these procedures are repeated from one to three times, the latex may be impregnated sufficiently into the voids between the fibers of the reinforcing material, and the desired membrane can be obtained. It is usually preferable to use a latex which contains more than 30% solids and which has a viscosity of about 10 to 500 cp./25° C.

The quantity of copolymer which is to be impregnated into the reinforcing material is also an important factor. If the quantity of copolymer which is impregnated into cloth is above a certain limit, there is a tendency for the copolymer and the cloth to exfoliate from each other when dipped in concentrated sulfuric acid. On the other hand, when the quantity of copolymer which is impregnated into the cloth is below a certain limit, no hydraulically impermeable membrane can be obtained. From this point of view, it has been ascertained that it is necessary that the quantity of latex which is impregnated into reinforcing material be on a dry basis, 50 to 85% by volume of the whole. It should be understood that the copolymer content in the present invention is used in this range.

According to the present invention, a drying step is performed after the said latex has been impregnated into the reinforcing material. The drying should be carried out by heating at a temperature lower than 120° C. Generally, it is preferable that the concentration of latex be so adjusted that the copolymer content is within the above-mentioned range by repeating once or twice the process of dipping the reinforcing material in latex and drying each time. It is needless to say that it is important, when immersing the reinforcing material in latex, to prevent the membrane from wrinkling and to impregnate the latex uniformly. It is a convenient and recommended method that in order to adjust and make uniform the quantity of latex which is impregnated into the reinforcing material, the membrane taken out from the latex is passed between two doctor knives before drying.

By these procedures, a dried membrane of linear copolymer consisting of a monovinyl aromatic hydrocarbon compound and a conjugated aliphatic polyene compound, supported or a reinforcing material, can be obtained. The copolymer content in a membrane thus obtained is in the range 50 to 85% and the balance is the content of reinforcing cloth. The proportion of monovinyl aromatic hydrocarbon compound contained in this copolymer is 20 to 75%. As mentioned previously, the membrane forming copolymer is linear, soluble in solvents for rubber such as benzene, and has an excellent elasticity and strength. Therefore, there is no possibility of the membrane fracturing during drying and other treatments.

According to the present invention, the membrane thus formed is sulfonated. Along with sulfonation, the copolymer is subjected to cyclization with the result that the said linear copolymer is converted into an insoluble and infusible three dimensional network structure under the action of concentrated sulfuric acid.

Although it is well known that natural rubber is converted into an insoluble infusible three dimensional network structure by cyclization with concentrated sulfuric acid, the synthetic rubbers, in particular styrene-butadiene copolymer rubbers, are generally thought to be cyclized with more difficulty. For example, it is known that block rubber of GR-S becomes insoluble only after being kneaded with concentrated sulfuric acid and heat-treated at 180° C. for 35 hours. However, the present inventors have ascertained the surprising fact that linear copolymers show cyclization simultaneously with sulfonation when dipped in concentrated sulfuric acid at temperatures lower than 50° C. for only several hours and are converted into insoluble and infusible three dimensional network structures. For the purpose of the sulfonation and cyclization, chlorosulfonic acid and chlorosulfonic acid or sulfur trioxide dissolved in organic solvents can not be used because the said linear copolymer is soluble in organic solvents and chlorosulfonic acid. Concentrated sulfuric acid is usable for the purpose. A suitable concentration of the sulfuric acid used is about 90 to 98%. It should be noticed that the reaction velocity of sulfonation of latex membranes of the linear copolymers described above is high and the velocity of sulfonation exceeds that of the cyclization reaction if the concentration of sulfuric acid is above the limit, with the result that the resin swells too much in the course of treatment and is apt to exfoliate from the reinforcing material. In particular, the higher the styrene content in the copolymer, the more marked is this tendency. Therefore, it is necessary to use sulfuric acid in a concentration lower than the above-mentioned limit. The upper limit of the concentration of sulfuric acid depends on the temperature at which the membrane is treated. The higher the temperature, the lower is the permissible concentration of sulfuric acid. For example, if treated at 40° C. there would occur exfoliation even with a concentration of sulfuric acid that does not bring about exfoliation at 30° C. From this point of view, in the present invention, the treatment with concentrated sulfuric acid should be carried out at temperatures lower than 50° C., preferably at from room temperature to 30° C. Furthermore, the treating time varies according to the concentration of sulfuric acid, the temperature of treatment, kind of copolymer and the like, and it should be selected in individual cases as hereinafter set forth in the examples. The number of sulfonic groups to be introduced by treatment with this concentrated sulfuric acid depends on the conditions of reaction, kind of copolymer and the like, and in practice 0.5 to 0.9 is suitable per aromatic nucleus of copolymer.

It is not necessary to follow any special procedure in the treatment with concentrated sulfuric acid. For example, in industrial mass production, it is advantageous to carry out continuously all procedures in such a manner that a long sheet of reinforcing material is successively dipped in a latex from its one end, taken out and then dried by passing it through a drier, after which the reinforced material is dipped in concentrated sulfuric acid, rinsed with weak sulfuric acid, and water by passing it through washing vessels, dried and rolled up again. When such mass production is not necessary, a sheet of membrane having a suitable size may be dipped in concentrated sulfuric acid, and then the membranes formed one by one are dipped in concentrated sulfuric acid, or any other suitable process may be adopted.

The membranes thus treated with concentrated sulfuric acid may be immediately washed with water. However, in the case of large-sized membranes, such as one square meter in area, it is preferable to prevent the membranes from becoming wrinkled; and to this end, sulfuric acids of different concentration from high concentration to 20 to 30% are prepared and the membranes are dipped successively in acids of progressively lower concentration and are thereafter rinsed by dipping in water. The membranes thus rinsed with water, if necessary, may be converted to Na-type by treating them with dilute caustic soda solution.

Cation permselective membranes thus obtained are very excellent in cation permselectivity to an extent that the transport number of cation (determined by a method as described later) is 0.90 to 0.93, the electric resistance is low (measured by a method as hereinafter described) and their bursting strength which is measured by Mullen's bursting strength tester is more than 100 lbs./in.$^2$.

The invention is further described in the following examples which serve to illustrate methods according to the present invention.

The transport number of cation through the membranes described in the specification and the following examples is that of sodium ion, which is calculated from the membrane potential which obtains at 25° C. when 0.5 and 1.0 N sodium chloride solutions are placed on opposite sides of the membranes. The effective electrical resistance means the resistance per 1 cm.$^2$ of the membrane, measured in 0.5 N sodium chloride solution at 25° C.; and bursting strength is a value measured by Mullen's bursting strength tester.

*Example 1*

A styrene-butadiene copolymer latex containing 29% of bound styrene and 60% of total solids was diluted with distilled water to a concentration at which total solids content was 57%. The viscosity of this diluted latex was 100 cp. at 25° C. In 500 cc. of this latex was dipped a glass-fiber cloth of 10 x 20 cm.$^2$. Thickness of this cloth was 0.075 mm., number of warp was 64 per inch and that of weft was 60 per inch, and apparent free space content of the cloth was 58.5%. After being dipped for 10 minutes the cloth was taken out and hung from its one end. And the superfluous latex was removed by lightly rubbing both sides of the membrane with glass rods and the cloth was then dried in the air for 16 hours. A finished membrane of styrene-butadiene synthetic copolymer supported by glass-fiber cloth was obtained after these procedures were repeated once more. Copolymer content in the membrane thus obtained was 76% and thickness was 0.14 to 0.15 mm. This copolymer being a linear copolymer of styrene and butadiene, it was soluble in solvents such as benzene.

This membrane piece was first dipped in 200 cc. of 96.2% sulfuric acid at 30° C. for 4 hours, after which the said piece was successively dipped in 200 cc. of 80%, 60% and 30% sulphuric acid for 15 minutes each. Thereafter, the membrane was rinsed by dipping in flowing water for 2 hours, and after being dipped in 200 cc. of N/2 NaOH solution for 30 minutes washed again in flowing water. All these procedures were carried out at room temperature with the exception of the designated cases.

The transport number of cations through the permselective membrane thus obtained was 0.92, the effective resistance 5.5 $\Omega$-cm.$^2$, thickness 0.22 mm., and bursting strength 160 lbs./in.$^2$.

The copolymer was sulfonated and cyclized simultaneously by the said treatment with 96% concentrated sulfuric acid and converted to an insoluble infusible three dimensional network structure.

*Example 2*

A styrene-butadiene copolymer latex containing 66% of bound styrene with total solids content 48%, and viscosity 17 to 21 cp. at 25° C. was used. In 500 cc. of this latex was dipped the same cloth with 10 x 20 cm.$^2$ dimensions as in Example 1. After being dipped for 10 minutes, the cloth was hung from one end and dried in the air for 10 hours, and the same dipping and drying procedures were repeated. Copolymer content in the obtained membrane of the said copolymer supported on a glass-fiber cloth was 79.5%. This membrane was dipped in 94.7% sulfuric acid at 30° C. for 4 hours and then treated in the same manner as in Example 1. The transport number of cations through the permselective membrane thus obtained was 0.91, the effective resistance 4.1 $\Omega$-cm.$^2$, bursting strength 160 lbs./in.$^2$, and thickness 0.19 mm. In this example, the membrane supported by the cloth was sulfonated and simultaneuosly cyclized by treatment with concentrated sulfuric acid, and converted to an insoluble infusible three dimensional network structure.

*Example 3*

A styrene-butadiene copolymer latex containing 46% of bound styrene has a total solids content of 30 to 42%. In 500 cc. of this latex was dipped a sheet of glass-fiber cloth of 10 x 20 cm.$^2$ dimensions. Thickness of this cloth was 0.1 mm., number of warp was 60 per inch and that of weft was 58 per inch, apparent void content was 57%. After being dipped for 3 minutes the cloth was taken out, hung from one end, and then dried by irradiating both its sides with two 250 w. infra-red lamps placed at a distance of 10 cm. for 10 minutes. The same dipping and drying procedures were repeated. Copolymer content in the membrane thus obtained was 63% by volume.

A piece of this membrane 10 x 10 cm.$^2$ was dipped in 200 cc. of 95.0% sulfuric acid at 30° C. for 5 hours and then treated in the same manner as in Example 1.

Similarly to the preceding examples, sulfonic groups were introduced in this membrane and simultaneously the synthetic rubber of linear copolymer was cyclized by treatment with the concentrated sulfuric acid.

The transport number of the final product was 0.90, the effective resistance 3.5 $\Omega$-cm.$^2$, bursting strength 230 lbs./in.$^2$, and thickness 0.29 mm.

Although in the above-mentioned examples certain copolymer latices of styrene-butadiene and glass fiber cloth were used as raw materials, similar cation permselective membranes can be obtained by using other linear copolymer latices prepared from other monovinyl aromatic hydrocarbon compounds and conjugated aliphatic polyene compounds and cloths of other fibers.

What is claimed is:

1. A process for the production of cation permselective membranes which have an insoluble, infusible synthetic organic solid polymeric structure, a reinforcing material supporting the said structure, and a dissociable sulfonic group bonded chemically to the said solid polymeric structure, comprising impregnating a latex of linear copolymer of a monovinyl aromatic hydrocarbon and a conjugated aliphatic polyene compound into the reinforcing material, the bound monovinyl aromatic hydrocarbon being 20 to 75% of the copolymer, drying to form a membrane of the said linear copolymer supported by the reinforcing material, and then contacting the said membrane with concentrated sulfuric acid, whereby sulfonic groups are introduced into the membrane and concurrently therewith the said linear copolymer is caused to cyclize into an insoluble, infusible three dimensional network.

2. A process as claimed in claim 1, in which the concentration of the latex is more than 30% by weight.

3. A cation permselective membrane produced by the process of claim 1.

4. A process for the production of cation permselective membranes which have an insoluble, infusible synthetic organic solid polymeric structure, a reinforcing material supporting the said structure, and a dissociable sulfonic group combined chemically with the said polymeric structure, comprising impregnating a latex of linear copolymer of styrene and butadiene into the reinforcing material, the bound styrene being 20 to 75% of the copolymer, drying to form a membrane of the said linear copolymer supported on the said reinforcing material, and then contacting the said membrane with concentrated sulfuric acid, whereby sulfonic groups are introduced into the membrane and simultaneously the said linear copolymer is caused to cyclize into an insoluble infusible three dimensional network structure.

5. A process as claimed in claim 4, in which the concentration of the latex is more than 30% by weight.

6. A process for the production of cation permselective membranes which have an insoluble, infusible synthetic organic solid polymeric structure, a reinforcing material supporting the said structure, and a dissociable sulfonic group combined chemically with the said solid polymeric structure, comprising impregnating a latex of linear copolymer of monovinyl aromatic hydrocarbon and conjugated aliphatic polyene compound into the reinforcing material having 45 to 70% of apparent free space, the bound monovinyl aromatic hydrocarbon being 20 to 70% of the copolymer, drying to form a membrane of the said linear copolymer supported on the said reinforcing material, and then contacting the said membrane with concentrated sulfuric acid, whereby sulfonic groups are introduced into the membrane and simultaneously the said linear copolymer is caused to cyclize into an insoluble, infusible three dimensional network structure.

7. A process as claimed in claim 6, in which the concentration of the latex is more than 30% by weight.

8. A process for the production of cation permselective membranes which have insoluble, infusible synthetic organic solid polymeric structure, a reinforcing material supporting the said structure, and a dissociable sulfonic group combined chemically with the said solid polymeric structure, comprising impregnating a latex of linear copolymer of monovinyl aromatic hydrocarbon and conjugated aliphatic polyene compound into the reinforcing material, the bound monovinyl aromatic hydrocarbon being 20 to 75% of the copolymer, drying to form a membrane of the said linear copolymer supported by the reinforcing material, the copolymer content of the membrane being 40 to 70% by volume, and then contacting the said membrane with concentrated sulfuric acid, whereby sulfonic groups are introduced into the membrane and simultaneously the said linear copolymer is caused to cyclize into an insoluble, infusible three dimensional network structure.

9. A process as claimed in claim 8, in which the concentration of the latex is more than 30% by weight.

10. A process for the production of cation permselective membranes which have an insoluble, infusible synthetic organic solid polymeric structure, a reinforcing material supporting the said structure, and a dissociable sulfonic group combined chemically with the said solid polymeric structure, comprising impregnating a latex of linear copolymer of styrene and butadiene into a reinforcing cloth having 45 to 70% of apparent free space, the bound styrene being 20 to 75% of the copolymer, drying to form a membrane of the said linear copolymer supported by the said reinforcing cloth, the copolymer content of the membrane being 40 to 70%, and then contacting the membrane with concentrated sulfuric acid, whereby sulfonic groups are introduced into the membrane and simultaneously the said linear copolymer is caused to cyclize into an insoluble, infusible three dimensional network structure.

11. A process as claimed in claim 10, in which the concentration of the latex is more than 30% by weight.

References Cited by the Examiner
UNITED STATES PATENTS 2,962,454  11/1960  McRae _____ 260—2.2

FOREIGN PATENTS 804,176  11/1958  Great Britain.

JOHN H. MACK, *Primary Examiner.*

D. R. JORDAN, *Assistant Examiner.*